No. 700,559. Patented May 20, 1902.
E. D. ROCKWELL.
FISH LINE REEL.
(Application filed Oct. 7, 1901.)
(No Model.) 2 Sheets—Sheet 1.
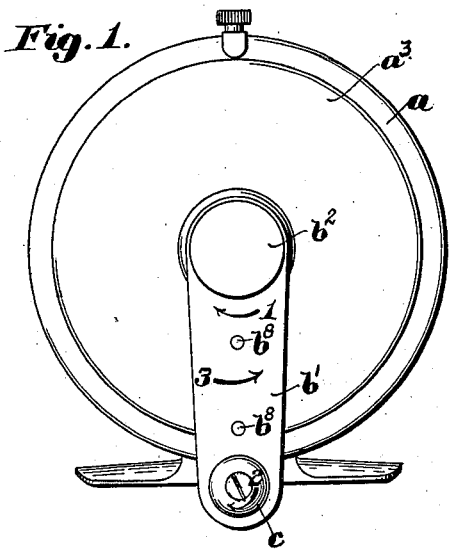
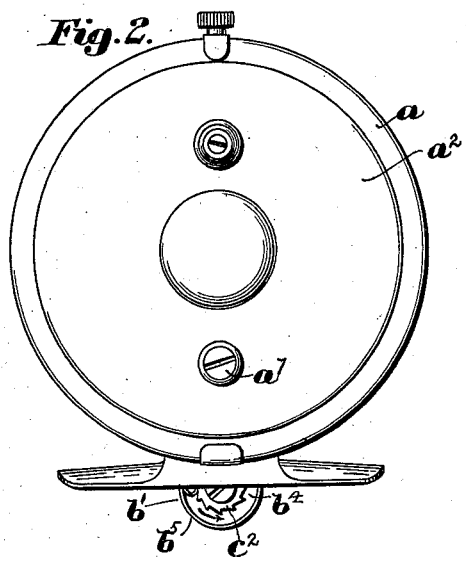
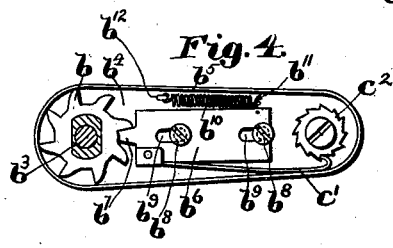
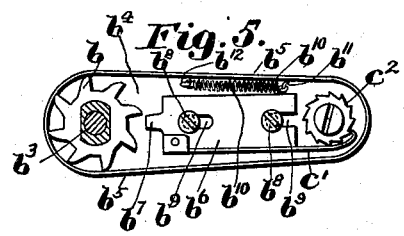
Witnesses:
Walter E. Lombard.
Mary A. Kenney
Inventor:
Edward D. Rockwell,
by J. Hart Anderson
Atty.

No. 700,559. Patented May 20, 1902.
E. D. ROCKWELL.
FISH LINE REEL.
(Application filed Oct. 7, 1901.)
(No Model.) 2 Sheets—Sheet 2.
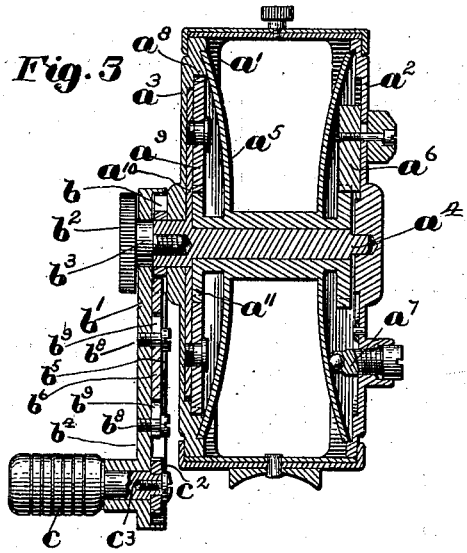
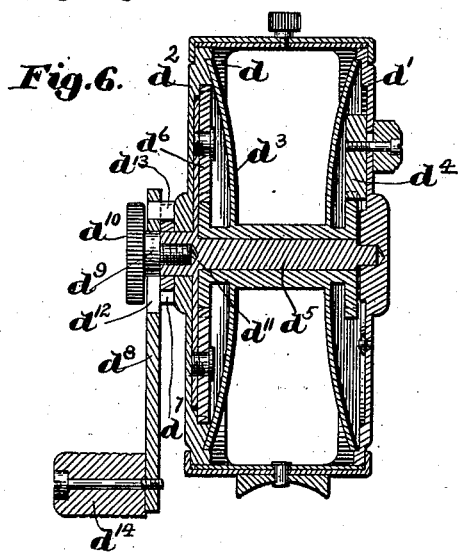
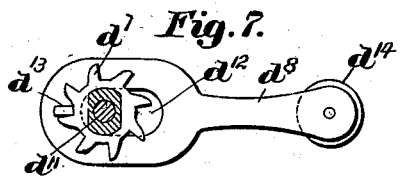
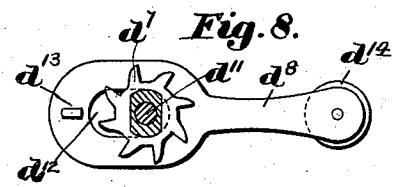
Witnesses:
Walter E. Lombard.
Mary A. Kenney.
Inventor:
Edward D. Rockwell,
by T. Hart Anderson
Atty.

UNITED STATES PATENT OFFICE.

EDWARD D. ROCKWELL, OF BRISTOL, CONNECTICUT, ASSIGNOR TO THE LIBERTY BELL COMPANY, OF BRISTOL, CONNECTICUT, A CORPORATION.

FISH-LINE REEL.

SPECIFICATION forming part of Letters Patent No. 700,559, dated May 20, 1902.

Application filed October 7, 1901. Serial No. 77,864. (No model.)

*To all whom it may concern:*

Be it known that I, EDWARD D. ROCKWELL, a citizen of the United States, residing at Bristol, in the county of Hartford and State of Connecticut, have invented certain new and useful Improvements in Fish-Line Reels; and I do hereby declare the following to be a full, clear, and exact description of the invention, such as will enable others skilled in the art to which it appertains to make and use the same.

The present invention relates to fish-line reels, and has for its object to produce a reel of simple form and arrangement and one that may be easily manipulated and in which a single actuating device controls the operation of the winding-cylinder to positively revolve the same in taking in the line and to apply a drag or brake to restrain the cylinder, the said actuating device being controlled by one hand, leaving the other hand free to handle the rod.

A further object is to so construct the device that it shall always be under the control of the person using it and in which it shall be unnecessary to let go the crank or arm in releasing the winding-cylinder to produce a "free reel" and in which the change from a positive winding condition to a free reel can be instantly accomplished and in which the drag or brake may be brought into action and released instantly when required.

To the above ends the present invention consists of the devices and combinations of devices, which will be hereinafter described and claimed.

The present invention is illustrated in the accompanying drawings, in which—

Figure 1 shows a reel in side elevation embodying the same. Fig. 2 shows an elevation of the opposite side. Fig. 3 shows a diametrical transverse section through the reel and its actuating crank or arm. Figs. 4 and 5 are views of the under side of the crank or arm, with the winding-shaft shown in section, and the ratchet-wheel of the winding-shaft, Fig. 4 showing the condition when the crank or arm is connected to drive the winding-cylinder and Fig. 5 when disconnected to produce a free reel. Fig. 6 illustrates the modified form of the device, showing a simple way of producing the drag or brake and a simpler form of the connecting mechanism between the winding-cylinder and the crank or arm. Figs. 7 and 8 show views of the under side of the crank or arm shown in Fig. 6, with the shaft in section, and the ratchet-wheel of the winding-shaft, illustrating the connecting and disconnecting positions of the crank or arm.

Similar letters of reference will be employed to designate corresponding parts throughout the specification and drawings.

In the drawings, $a$ represents the supporting-frame, comprising a skeleton cylinder $a'$ and the inclosing sides or caps $a^2$ and $a^3$. Mounted in suitable bearings in the caps $a^2$ and $a^3$ is the winding-shaft $a^4$, which carries the winding-cylinder $a^5$.

The device as so far described is constructed like that shown in my companion application filed of even date herewith, and like the device of said application the present device, as illustrated in Figs. 1, 2, and 3, is provided with a click $a^6$ and a brake or drag $a^7$, supported upon the inner face of the cap $a^2$, and the winding-cylinder is driven by a multiplying mechanism also like that of the application referred to, comprising a fixed internal gear $a^8$, which meshes with pinions $a^9$, mounted on a carrier $a^{10}$, carried by the shaft $a^4$, and which in turn mesh with and drive a pinion $a^{11}$, fixed to the winding-cylinder $a^5$.

At this point I desire to say that while the arrangement thus described is one that I deem preferable and one which has been found to produce good results it is not absolutely essential to the present invention, and the present invention does not depend on any particular form of driving mechanism or any particular form of brake mechanism, and in so far as the present invention is concerned, while it contemplates the use of a suitable brake or drag it is to be understood that it is not limited to the employment of any particular form of brake or drag or any particular form of driving mechanism.

It is desired in the present invention to provide an actuating device for a reel so constructed and arranged that by a simple shifting movement of the crank or arm with relation to the winding-shaft, either axially about said shaft or transversely across said shaft, the crank or arm will be disconnected from said shaft, producing a free reel or connected thereto, and, further, to arrange the brake to be brought into play by lateral force applied to the crank or arm.

In one form of the present invention, as will be hereinafter noted, the disconnection may be produced either by a movement of the crank or arm in a direction reverse to the driving or winding movement while grasping the knob or handle or by a turning of the knot or handle without moving the crank or arm.

In the form of the device shown in Figs. 1, 2, and 3 there is secured to the end of the driving-shaft $a^4$ a ratchet-wheel $b$, which, as shown in Figs. 4 and 5, is fitted upon a square portion of the said shaft. Movably fitted to the shaft $a^4$ is a crank or arm $b'$, which is held to the shaft $a^4$ by a thumb-screw $b^2$, having a circular boss $b^3$, about which the crank or arm $b'$ is free to turn when disconnected from the shaft $a^4$.

As will be hereinafter more fully described, the crank or arm $b'$ is provided with a suitable pawl arranged to be engaged with the ratchet-wheel $b$ or disengaged therefrom, whereby it is connected to and disconnected from said shaft, and in Figs. 3, 4, and 5 the preferred form of this pawl and connecting and disconnecting mechanism is illustrated and will now be described.

Upon its under side the crank or arm $b'$ is provided with a flange $b^5$, forming a recess $b^4$. Within the recess $b^4$ is placed a sliding pawl $b^6$, which at its lower end carries a projection $b^7$, arranged to engage a tooth of the ratchet-wheel $b$. The pawl is held upon the under side of the crank or arm $b'$ by means of the screws $b^8$, which pass through slots $b^9$ in said pawl. The pawl is normally moved toward and held in engagement with the ratchet-wheel $b$ by means of a spring, which, as shown, consists of a coiled spring $b^{10}$, which at one end engages a pin $b^{11}$, projected from the side of the pawl $b^6$, and at its opposite end carries a hook or eye $b^{12}$, fastened to the under side of the crank or arm $b'$.

As hereinbefore stated, I have provided means for withdrawing the pawl from engagement with the ratchet-wheel controlled and actuated by the knob or handle $c$, by means of which the crank or arm $b'$ may be turned, and this disconnecting mechanism is so constructed and arranged that it may be actuated to disconnect by imparting a movement to the crank or arm in a reverse direction to the winding movement while firmly grasping the knob or handle, or, on the other hand, it may be actuated by simply turning the knob or handle $c$ about its axis without imparting the reverse movement to the crank or arm. As shown in Figs. 3, 4, and 5, this mechanism consists of a spring-pawl $c'$, which at its lower end is connected to the sliding pawl $b^6$ and at its opposite end is bent over into a hook shape and engages a ratchet-wheel $c^2$, mounted upon the inner end of the shaft or post $c^3$, which supports the knob or handle $c$.

The operation of the device is as follows: A movement of the crank or arm $b'$ in the direction of the arrow 1 (shown in Fig. 1) while gripping the knob or handle $c$ will revolve the shaft $a^4$ and the reel $a^5$, thus taking in the line, the pawl $b^6$ during this forward movement being in engagement with the ratchet-wheel $b$. If it should be desired to produce a free reel, this may be done either by turning the knob or handle $c$ in the direction shown by the arrow 2 in Fig. 1 while the crank or arm remains stationary or while tightly holding the knob or handle $c$ by moving the crank or arm $b'$ in the direction shown by the arrow 3 in Fig. 1. This will result in a turning of the ratchet $c^2$ in a direction to cause one of its teeth to engage the hooked arm of the pawl $c'$ and withdraw the sliding pawl $b^6$ from engagement with the ratchet-wheel $b$. While in this condition the winding-cylinder $a^5$ may freely turn, entirely disconnected from its actuating mechanism, permitting the free drawing out of the line from the reel. Should it be desired during this condition of the apparatus to bring into action the brake or drag, this is accomplished by applying force to the crank or arm $b'$ in a lateral direction, as shown in Fig. 3, for instance, in a direction which will cause the shaft and winding-cylinder to move toward the brake or drag $a^7$ to force one side of the winding-cylinder into a frictional contact with the brake or drag.

It is to be understood that during the operation of the device just described the knob or handle $c$ is never released by the operator and that while always maintaining his hold upon the knob or handle he can by a simple manipulation of the crank or arm connect it with the winding-cylinder for taking in the line, disconnect it from the winding-cylinder to produce a free reel, and instantly bring into action the drag or brake when desired.

I desire to state at this point that in so far as I am aware of the prior art I am the first to ever produce a fish-line reel where the conditions just described are produced by a single actuating device, and I desire it to be understood that while the illustrated embodiment of my invention is the best one now known to me it is not limited to any particular form of mechaniam for producing such results.

In the modified form of the invention shown in Figs. 6, 7, and 8 the reel may be constructed and arranged in any desired or usual manner; but it is shown as comprising a skeleton frame $d$, having caps $d'$, $d^2$, and $d^3$, a click $d^4$, a winding-shaft $d^5$, and the multiplying mechanism $d^6$, all as hereinbefore referred to and as shown in my said application; but this illustration is simply for convenience in describing the invention, and, as suggested, it may be modified in any way desired, and I desire to state that in regard to both forms of the present invention it is not dependent upon any particular arrangement of the reel and its driving mechanism.

In Fig. 6 the shaft $d^5$ carries upon its outer end a pawl $d^7$, held thereto, and like the pawl $b$, as hereinbefore described, the crank or arm $d^8$ is likewise held to the shaft $d^5$ upon a rounded portion $d^9$ of the thumb-screw $d^{10}$, tapped in a threaded aperture $d^{11}$ in the end of the shaft $d^5$. In this form of the invention the crank or arm $d^8$ is provided with an elongated slot $d^{12}$, which permits a movement of the crank or arm across or in a direction transverse to the axis of the shaft $d^5$, and upon its under face it carries a tooth or pawl $d^{13}$, which by the movement of the crank or arm $d^8$ across the axis of the shaft $d^5$ is arranged to be connected with or disconnected from the ratchet-wheel $d^7$, as occasion may require, to produce a positive driving connection or a free reel.

The crank or arm is provided with a knob or handle $d^{14}$, whereby it may be manipulated, and in this form of the present invention the brake or drag is produced by the frictional engagement of the crank or arm with the inner opposing faces of the head $d^{10}$ of the thumb-screw and the ratchet $d^7$, caused by the lateral pressure applied to the crank or arm, which pressure may be toward the reel or away from the reel either by pushing or pulling upon the knob or handle $d^{14}$. When the pressure is thus applied, the crank or arm is caused to frictionally engage the inner face of the head of the thumb-screw and the inner face of the ratchet-wheel, thus retarding the turning of the shaft $d^5$, which, through the multiplying mechanism, retards the turning of the winding-cylinder $d^3$. I may state in this connection that should my present invention be embodied in a reel without a multiplying mechanism the winding-cylinder and shaft will be fixedly connected together.

It will be noted that in the modified form of my invention there is a single actuating device which the operator always retains hold of and which by a simple movement may be connected with or disconnected from the winding-shaft and when disconnected subjected to lateral force to bring into action the brake or drag.

I claim—

1. In a fish-line reel, in combination, a supporting-frame, a winding-cylinder mounted to turn therein, a drag or brake for restraining the turning of said cylinder, a single actuating device for turning said cylinder for producing the desired frictional contact between said drag or brake and winding-cylinder, and means for connecting and disconnecting said actuating device and winding-cylinder, substantially as described.

2. In a fish-line reel, in combination, a supporting-frame, a winding-cylinder mounted to turn therein, a drag or brake for restraining the turning of said cylinder, a crank or arm for turning said cylinder, a detachable connection between said crank or arm and said cylinder, said crank or arm arranged to apply the drag or brake when disconnected from the cylinder, substantially as described.

3. In a fish-line reel, in combination, a supporting-frame, a winding-cylinder mounted to turn therein, a crank or arm for turning said cylinder, a knob or handle carried by and arranged to turn in said crank or arm and a detachable connecting mechanism actuated by the turning of said knob or handle, substantially as described.

4. In a fish-line reel, in combination, a supporting-frame, a winding-cylinder mounted to turn therein, a crank or arm for turning said cylinder, a knob or handle arranged to turn in said crank or arm, and means supported by said crank or arm and controlled by the knob or handle arranged to connect said crank or arm to the cylinder upon a turning of said crank or arm in one direction and to disconnect said crank or arm from the cylinder upon a turning of the crank or arm in the reverse direction while holding the knob or handle, substantially as described.

5. In a fish-line reel, in combination, a supporting-frame, a winding-cylinder mounted to turn therein, a crank or arm for turning said cylinder, a sliding spring-pressed pawl carried by the crank or arm for connecting said crank or arm to the cylinder, and a knob or handle carried by said crank or arm and connected to said spring-pressed pawl for withdrawing the pawl and disconnecting the crank or arm from the cylinder, substantially as described.

6. In a fish-line reel, in combination, a supporting-frame, a winding-cylinder mounted to turn therein, a crank or arm for turning said cylinder, a detachable connecting mechanism between the crank or arm and cylinder, a pawl-and-ratchet device for actuating the detachable connecting mechanism, and a knob or handle for turning said crank or arm and actuating said pawl-and-ratchet mechanism when turned in a reverse direction to disconnect said crank or arm from the winding-cylinder, substantially as described.

7. In a fish-line reel in combination, a supporting-frame, a winding-cylinder mounted to turn therein, a crank or arm for actuating said cylinder, a knob or handle mounted to turn in the free end of said crank or arm and a detachable connecting mechanism arranged to be operated to disconnect the crank or arm from the winding-cylinder by the turning of the knob or handle, substantially as described.

8. In a fish-line reel, in combination, a supporting-frame, a winding-cylinder mounted to turn therein, a crank or arm for turning said cylinder, a sliding spring-pressed pawl for connecting said crank or arm with the cylinder, a knob arranged to freely turn in said crank or arm, a ratchet secured to the inner end of said knob, and a spring-pawl connecting the sliding pawl with said ratchet, substantially as described.

9. In a fish-line reel, in combination, a supporting-frame, a winding-cylinder mounted to turn therein, a crank or arm detachably connected with said cylinder, a drag or brake for restraining the turning of said cylinder, said drag or brake arranged to be applied by lateral force applied to the crank or arm when disconnected from the winding-cylinder, substantially as described.

10. In a fish-line reel, in combination, a supporting-frame, a winding-cylinder and its shaft mounted to turn therein, a crank or arm detachably connected with the shaft for turning said cylinder, and fixed collars carried by said shaft upon opposite sides of the crank or arm and arranged to frictionally engage said crank or arm when lateral force is applied thereto to restrain the turning of said winding-cylinder, substantially as described.

In testimony whereof I affix my signature in presence of two witnesses.

EDWARD D. ROCKWELL.

Witnesses:
ADALINE B. NEWELL,
ROGER S. NEWELL.